United States Patent
Marcotte et al.

(10) Patent No.: US 9,765,991 B2
(45) Date of Patent: Sep. 19, 2017

(54) TROUGH SOLAR COLLECTOR MODULE

(75) Inventors: Patrick Marcotte, Lakewood, CO (US); Edmund Kenneth May, Lakewood, CO (US)

(73) Assignee: ABENGOA SOLAR INC., Lakewood, CO (US)

( * ) Notice: Subject to any disclaimer, the term of this patent is extended or adjusted under 35 U.S.C. 154(b) by 770 days.

(21) Appl. No.: 14/003,649

(22) PCT Filed: Mar. 8, 2011

(86) PCT No.: PCT/US2011/027601
§ 371 (c)(1),
(2), (4) Date: Oct. 24, 2013

(87) PCT Pub. No.: WO2012/121712
PCT Pub. Date: Sep. 13, 2012

(65) Prior Publication Data
US 2014/0034042 A1 Feb. 6, 2014

(51) Int. Cl.
*F24J 2/12* (2006.01)
*F24J 2/10* (2006.01)
(Continued)

(52) U.S. Cl.
CPC ............... *F24J 2/12* (2013.01); *B21D 53/08* (2013.01); *F24J 2/1057* (2013.01); *F24J 2/14* (2013.01);
(Continued)

(58) Field of Classification Search
CPC .................... F24J 2/12; F24J 2/38; F24J 2/54
(Continued)

(56) References Cited

U.S. PATENT DOCUMENTS 4,119,365 A  10/1978  Powell
4,205,659 A   6/1980  Beam
(Continued)

FOREIGN PATENT DOCUMENTS

CH    637 202 A5   7/1983
CN    2729588 Y    9/2005
(Continued)

OTHER PUBLICATIONS

Office Action from Chinese Application No. 201180070749.8, mailed Feb. 3, 2015, 11 pages.
(Continued)

*Primary Examiner* — Gregory Huson
*Assistant Examiner* — Nikhil Mashruwala
(74) *Attorney, Agent, or Firm* — Hayes Soloway PC

(57) ABSTRACT

A concentrating solar collector module includes improvements in performance and assemblability. In one configuration, the module includes a reflector having a reflective front surface shaped to concentrate incoming solar radiation onto a focal line, first and second rails, one rail attached to each edge of the reflector, and a set of truss connectors attached to the rails. The truss connectors and rails may form ways that enable constrained sliding engagement of the truss connectors along the rails before attachment of the truss connectors to the rails. The module may also include a plurality of framing members connected to the truss connectors and forming a structural lattice that cooperates with the reflector to lend rigidity to the solar collector module. At least some of the framing members may be disposed in front of the front reflective surface.

21 Claims, 7 Drawing Sheets

(51) Int. Cl.
- *F24J 2/14* (2006.01)
- *F24J 2/46* (2006.01)
- *B21D 53/08* (2006.01)
- *F24J 2/38* (2014.01)
- *F24J 2/54* (2006.01)

(52) U.S. Cl.
CPC .............. *F24J 2/38* (2013.01); *F24J 2/4636* (2013.01); *F24J 2/541* (2013.01); *F24J 2002/467* (2013.01); *F24J 2002/4656* (2013.01); *Y02B 10/20* (2013.01); *Y02E 10/45* (2013.01); *Y02E 10/47* (2013.01); *Y10T 29/49355* (2015.01)

(58) Field of Classification Search
USPC .................. 126/569, 600, 694, 696; 136/246
See application file for complete search history.

(56) References Cited

U.S. PATENT DOCUMENTS

| | | | |
|---|---|---|---|
| 4,546,757 A | 10/1985 | Jakahi | |
| 4,583,520 A * | 4/1986 | Dietrich | F24J 2/12 |
| | | | 126/602 |
| 4,611,575 A | 9/1986 | Powell | |
| 5,071,243 A | 12/1991 | Bronstein | |
| 5,134,827 A | 8/1992 | Hartman | |
| 5,191,876 A | 3/1993 | Atchley | |
| 6,485,152 B2 * | 11/2002 | Wood | F24J 2/10 |
| | | | 126/696 |
| 7,240,674 B2 | 7/2007 | Patterson | |
| 8,322,833 B2 * | 12/2012 | Grossrubatscher | B41J 2/155 |
| | | | 347/85 |
| 8,615,960 B2 * | 12/2013 | Marcotte | F24J 2/14 |
| | | | 52/638 |
| 8,739,492 B2 * | 6/2014 | Hawkins | E04B 1/1903 |
| | | | 403/169 |
| 8,746,233 B2 * | 6/2014 | Gonzalez Moreno | F24J 2/12 |
| | | | 126/600 |
| 8,806,834 B2 * | 8/2014 | Werner | F16C 13/04 |
| | | | 126/600 |
| 8,844,519 B2 * | 9/2014 | Marcotte | F24J 2/14 |
| | | | 126/684 |
| 9,057,543 B2 * | 6/2015 | Marcotte | F24J 2/14 |
| 2005/0163564 A1 | 7/2005 | Tuell | |
| 2008/0247069 A1 | 10/2008 | Bronstein | |
| 2008/0308094 A1 * | 12/2008 | Johnston | F24J 2/145 |
| | | | 126/694 |
| 2009/0056698 A1 | 3/2009 | Johnson et al. | |
| 2009/0056787 A1 | 3/2009 | Johnson et al. | |
| 2009/0256046 A1 | 10/2009 | Hausner et al. | |
| 2010/0252030 A1 | 10/2010 | Marcotte et al. | |
| 2010/0258186 A1 | 10/2010 | Harrenstien et al. | |
| 2013/0112188 A1 * | 5/2013 | Reynolds | F24J 2/38 |
| | | | 126/585 |
| 2014/0182578 A1 * | 7/2014 | Fortin | G02B 7/198 |
| | | | 126/600 |

FOREIGN PATENT DOCUMENTS

| | | |
|---|---|---|
| CN | 101796653 A | 8/2010 |
| DE | 3822178 A1 | 1/1990 |
| EP | 1903155 A1 | 3/2008 |
| ES | 2440370 | 1/2014 |
| ES | 2441250 | 2/2014 |
| ES | 2449643 | 3/2014 |
| ES | 2451966 | 3/2014 |
| ES | 2454515 | 4/2014 |
| ES | 2474919 | 7/2014 |
| ES | 2476065 | 7/2014 |
| WO | 2005/120172 A2 | 12/2005 |

OTHER PUBLICATIONS

International Search Report and Written Opinion of PCT/US11/27601 mailed on May 5, 2011, 9 pages.
Office Action in ES application 2013/90078, mailed on Oct. 27, 2014, 2 pages.
Extended European Search Report in EP application 11860476.8 mailed on Oct. 28, 2014.
ES Patent Application 201390078, Office Action mailed on May 13, 2014, 5 pages.

* cited by examiner

TROUGH SOLAR COLLECTOR MODULE

CROSS-REFERENCE TO RELATED APPLICATION

This Application claims priority to International Patent Application No. PCT/US2011/027601, filed on Mar. 8, 2011 and entitled TROUGH SOLAR COLLECTOR MODULE, the entire disclosure of which is hereby incorporated by reference for all purposes.

BACKGROUND

Concentrating solar collectors have a variety of uses, for example heating water for domestic or industrial uses, or for providing heat for power generation in a concentrating solar power plant. FIG. 1 illustrates a schematic view of a portion of a conventional concentrating solar collector installation. A solar collector assembly 100 includes two solar collector modules 101a and 101b. The modules 101a and 101b are mounted on pylons 102a-c, and can rotate about an axis 103 to track the sun. Each module includes a trough-shaped reflector 104 that reflects incoming solar radiation 105 onto a receiving tube 106. For example, the reflector 104 may be in the shape of a parabolic cylinder, and the receiving tube may be placed at the focal line of the parabolic cylinder where the reflected solar radiation is concentrated. The receiving tube 106 carries a working fluid, for example water, oil, or another working fluid, that is heated by the concentrated solar radiation. The working fluid is piped to a central location for use. For example, heated water may be carried to an industrial process or used for hydronic space heating. Alternatively, the heat transfer fluid may be carried to a power generation plant that generates electric power using heat provided by the working fluid.

While only two collector modules 101a and 101b are shown in FIG. 1, many more modules may be present, and may be arranged in rows called solar collector assemblies. The modules in a solar collector assembly are interconnected so that they rotate in unison. A drive system (not shown) placed at an end or preferably near the center of a solar collector assembly provides torque for rotating the assembly. A solar collector assembly may include as many as dozens of modules, and the collector field may include hundreds or thousands of modules.

In order to maintain proper aiming of all of the modules in a solar collector assembly to track the sun, the modules must transfer sufficient torque between them to drive the assembly and to withstand wind loading, and the modules and any torque transfer mechanism should be stiff enough that the torque is transferred without undue twisting of the assembly.

It is also desirable that parts of a solar collector installation be configured such that they can be efficiently shipped to an installation site and assembled easily at the installation site.

BRIEF SUMMARY

According to one aspect, a concentrating solar collector module comprises a reflector having a reflective front surface shaped to concentrate incoming solar radiation onto a focal line, the reflector having two lengthwise edges parallel to the focal line and two ends defining the length of the reflector. The module further comprises first and second rails, one rail attached to the reflector at each of the lengthwise edges and extending substantially the length of the reflector, and a set of truss connectors attached to the rails. The truss connectors and rails comprise ways that enable constrained sliding engagement of the truss connectors along the rails before attachment of the truss connectors to the rails. The module further includes a plurality of framing members connected to the truss connectors.

In some embodiments, the framing members form a structural lattice that cooperates with the reflector to lend rigidity to the solar collector module, and at least some of the framing members are disposed in front of the front reflective surface. The ways may comprise dovetail protrusions on either the rails or the truss connectors, and complementary dovetail slots on the other of the rails or the truss connectors. The ways may comprise T-shaped protrusions on the either the rails or the truss connectors, and complementary T-shaped slots on the other of the rails or the truss connectors.

In some embodiments, the set of truss connectors comprises an end truss connector at each end of each rail, and the framing members comprise two end trusses, one end truss at each end of the solar collector module connected between the respective end truss connectors. In some embodiments, the frame members comprise at least two diagonal framing members, each diagonal framing member connected to a truss connector on the first rail and a truss connector on the second rail, the diagonal framing members crossing the solar collector module in front of the reflective surface. The frame members may comprise at least four diagonal framing members. In some embodiments, the frame members comprise at least one transverse brace connected to a truss connector on the first rail and a truss connector on the second rail, the transverse brace crossing the solar collector module in front of the reflective surface. The transverse brace may be identical to a member of each end truss.

In some embodiments, the concentrating solar collector module further comprises a vertical support and a diagonal support for the transverse brace, and the vertical support and the diagonal support are identical to members of the end trusses. The concentrating solar collector module may further comprise a fixed receiver support extending from one of the two end trusses. In some embodiments, the receiver support flexes to accommodate thermal expansion and contraction in a solar collector comprising the module. The receiver support may comprise a reflective surface, to reduce end losses from the solar collector module. In some embodiments, at least one truss connector at a corner of the module is identical to another truss connector positioned other than at a corner of the module. Each rail may be hollow, and comprise at least one internal reinforcement web. In some embodiments, each rail comprises top and bottom edge features that include a protrusion on either the top or bottom edge of the rail and a complementary indentation on the other of the top or bottom edge of the rail, the protrusion and indentation aligned to mate when a precursor portion of the solar collector module is stacked with a precursor portion of another like solar collector module. In some embodiments, each rail comprises a tab tangent to the front reflective surface, the tab attached to the reflector. In some embodiments, the concentrating solar collector module further comprises a set of parabolic ribs in contact with a back side of the reflector, opposite the reflective front surface. The concentrating solar collector module may further comprise bearings that define a rotational axis of the solar collector module, the rotational axis parallel to the focal line.

According to another aspect, an extruded rail for assembly into a concentrating solar collector module comprises an elongate hollow body, at least one ways feature formed on one side of the body and shaped to accept a truss connector and to enable constrained sliding engagement of the truss connector and the rail, mating features on a top and bottom of the rail, the mating features aligned to facilitate stacking of an assembly incorporating the rail with a like assembly, and an angled tab for attaching the rail to a reflector of the solar collector module, the angled tab positioned to be disposed tangent to a curvature of the reflector. The extruded rail may further comprise at least one internal reinforcing web. In some embodiments, the at least one ways feature includes a dovetail slot or a T-shaped slot. In some embodiments, the at least one ways feature includes a dovetail protrusion or a T-shaped protrusion.

According to another aspect, a truss connector comprises a generally U-shaped body having a base portion and two spaced apart sides extending from the base portion, the body having a length, and at least one ways feature on the base portion shaped to cooperate with a complementary feature of another body, to form ways that enable constrained sliding engagement of the truss connector along the other body. The sides define at least one set of holes for receiving a fastener to connect a structural member to the truss connector. The base portion may define at least one hole for receiving a fastener to fix the truss connector to the other body. The ways feature may comprise a dovetail protrusion or slot. The ways feature may comprise a T-shaped protrusion or slot.

According to another aspect, a method of assembling a concentrating solar collector module comprises providing a reflector having a reflective front surface shaped to concentrate incoming solar radiation onto a focal line, the reflector having two lengthwise edges parallel to the focal line and two ends defining the length of the reflector, and first and second rails, one rail attached to the reflector at each of the lengthwise edges and extending substantially the length of the reflector. The method further comprises providing a set of truss connectors, the truss connectors and rails comprising ways that enable constrained sliding engagement of the truss connectors along the rails, and engaging the truss connectors with the rails. The method further comprises connecting a plurality of framing members to the truss connectors, and tensioning the diagonal framing members to stiffen the solar collector module. In some embodiments, the method further comprises adjusting optical performance of the solar collector module by adjusting the tension in at least one of the diagonal framing members.

According to another aspect, a concentrating solar collector comprises at least two collector modules, each module comprising a reflector having a reflective front surface shaped to concentrate incoming solar radiation onto a focal line, and the reflector having two lengthwise edges parallel to the focal line and two ends defining the length of the reflector; first and second rails, one rail attached to the reflector at each of the lengthwise edges and extending substantially the length of the reflector; a set of truss connectors attached to the rails, the truss connectors and rails comprising ways that enable constrained sliding engagement of the truss connectors along the rails before attachment of the truss connectors to the rails; a plurality of framing members connected to the truss connectors, forming a structural lattice that cooperates with the reflector to lend rigidity to the solar collector module, at least some of the framing members being disposed in front of the front reflective surface; and bearings that define a rotational axis of the module parallel to the focal line. At least one of the truss connectors extends beyond an end of its respective module, and the concentrating solar collector further comprises a connection between the extending truss connector and an adjacent collector module, to transmit torque between the two adjacent modules.

According to another aspect, a receiver support in a concentrating solar collector module comprises a sheet metal shape having features for attaching the sheet metal shape to a structural element of the solar collector module and features for attaching a receiver tube to the receiver support. The receiver support is shaped to be stiff in directions transverse to the longitudinal axis of the receiver tube, and to be flexible in a direction parallel to the longitudinal axis of the receiver tube. In some embodiments, the receiver support undergoes only elastic deformation in accommodating thermal expansion in the solar collector module. In some embodiments, the receiver support comprises reflective surfaces to reduce end losses from the solar collector module.

According to another aspect, a structural lattice comprises first and second rails disposed parallel to each other, and a set of truss connectors attached to the rails. The truss connectors and rails comprise ways that enable constrained sliding engagement of the truss connectors along the rails before attachment of the truss connectors to the rails. The ways comprise protrusions on either the truss connectors or the rails, and complementary slots on the other of the truss connectors or the rails. The structural lattice further comprises a plurality of framing members connected to the truss connectors, the framing members comprising at least two transverse framing members and at least two diagonal framing members. The protrusions and slots may comprise dovetail protrusions and slots. The protrusions and slots may comprise T-shaped protrusions and slots. In some embodiments, the structural lattice further comprises a clevis at each end of each diagonal framing member, and each clevis is attached to its respective truss connector using a pin. In some embodiments, the effective length of each diagonal framing member is adjustable. In some embodiments, the framing members comprise end trusses, one end truss at each end of the structural lattice connected between the respective end truss connectors.

DETAILED DESCRIPTION

Figure 1:
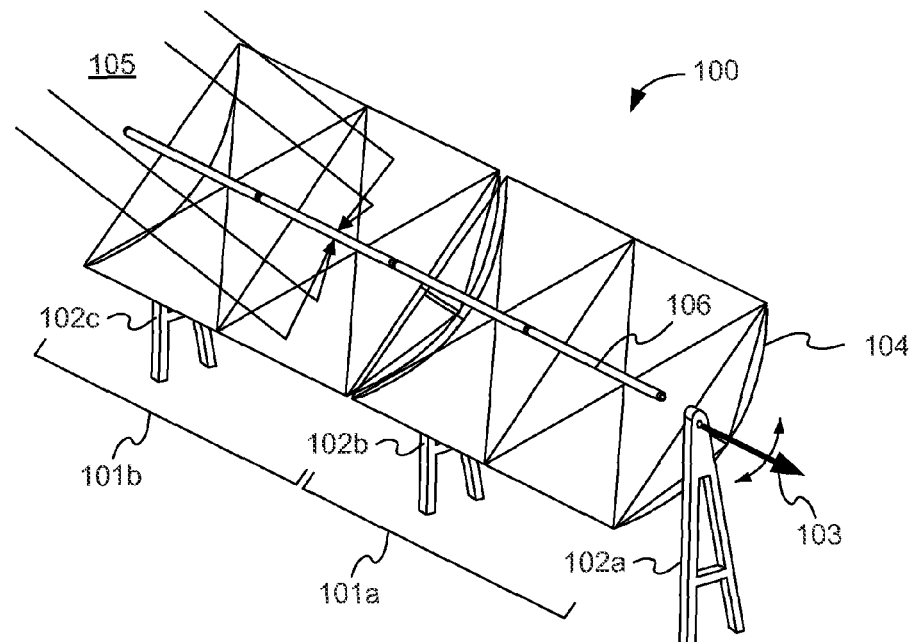
FIG. 1 illustrates a schematic view of a portion of a typical concentrating solar collector installation.
Figure 2:
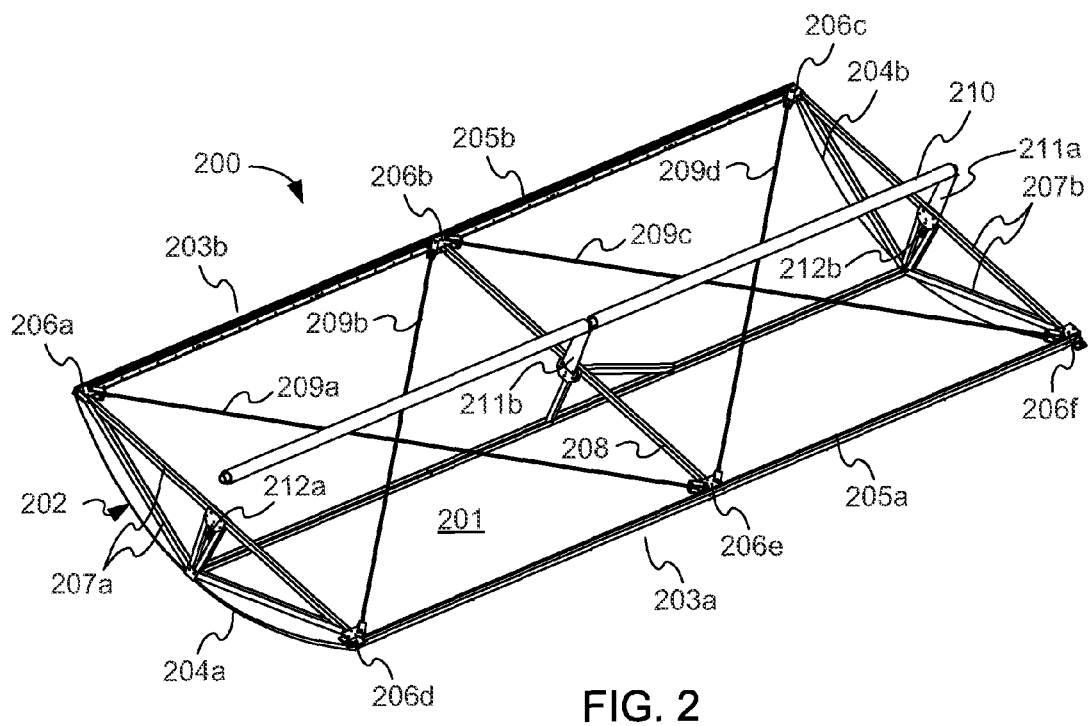
FIG. 2 illustrates a solar collector module according to embodiments of the invention.

FIG. 2 illustrates a solar collector module 200 according to embodiments of the invention. The module 200 includes a reflector 201 having a curved front surface visible in FIG. 2, and a curved rear surface 202. The reflector 201 is shaped to concentrate incoming solar radiation onto a focal line. For example, the reflector 201 may be in the shape of a parabolic cylinder, although it is contemplated that other reflective shapes may be used, including nonimaging shapes. It is also to be understood that a "focal line" includes any long narrow target area or volume, such as the surface of a receiving tube as described below. The reflector 201 may be made of sheet metal, for example sheet steel or aluminum having a thickness of between 0.020 and 0.100 inches, and may be polished, plated, coated, laminated, or otherwise treated such that its front surface is highly reflective. Other materials and surface treatments may also be used.

The reflector 201 has two lengthwise edges 203a and 203b, and two end edges 204a and 204b. The distance between the ends 204a and 204b is considered to be the length of the reflector 201. Two rails 205a and 205b are attached to the reflector 201, one along each lengthwise edge of the reflector 201. In some embodiments, the length of the module 200 may be 240 inches and the overall width of the module 200 may be 90.75 inches, although embodiments of the invention may be of any workable size. A set of truss connectors 206a-f are attached to the rails 205a and 205b for connecting a plurality of framing members. The truss connectors 206a-f and rails 205a, 205b comprise ways that are configured to enable a portion of the truss connectors to be received into the rails and to slide along the length of the rails before the truss connectors are attached to the rails.

The framing members connected by the ways include two end trusses 207a and 207b, one truss at each end of the reflector 201, a transverse brace 208 near the center of the reflector 201, and several diagonal braces 209a-d that cross the module 200 in front of the front reflective surface of the reflector 201. The framing members, including the rails 205a and 205b and the diagonal braces 209a-d, form a structural lattice at the front of the module 200. The reflector 201 itself may also be a structural member, and the reflector 201 and the structural lattice may cooperate to lend stiffness to the module 200. Preferably, the diagonal braces 209a-d are in tension, while the transverse brace 208 and portions of the end trusses 207a and 207b are in compression, to maintain the proper spacing between the rails 205a and 205b. In other embodiments, for example in a smaller collector module, the transverse brace 208 may not be present, and only two diagonal braces may be used, extending between truss connectors at the corners of the modules. In other embodiments, multiple transverse braces may be present, and more than four diagonal braces may be used.

FIG. 2 shows that a receiver tube 210 is held at the focal line of the reflector 201 by receiver supports 211a and 211b. The module 200 may further comprise bearings 212a and 212b, that define a rotational axis for the module 200 and support the weight of the module 200 when it is mounted on pylons (not illustrated in FIG. 2). Alternatively, the module 200 may include only a shaft at each end, configured to mate with bearings on the pylons.

Figure 3:
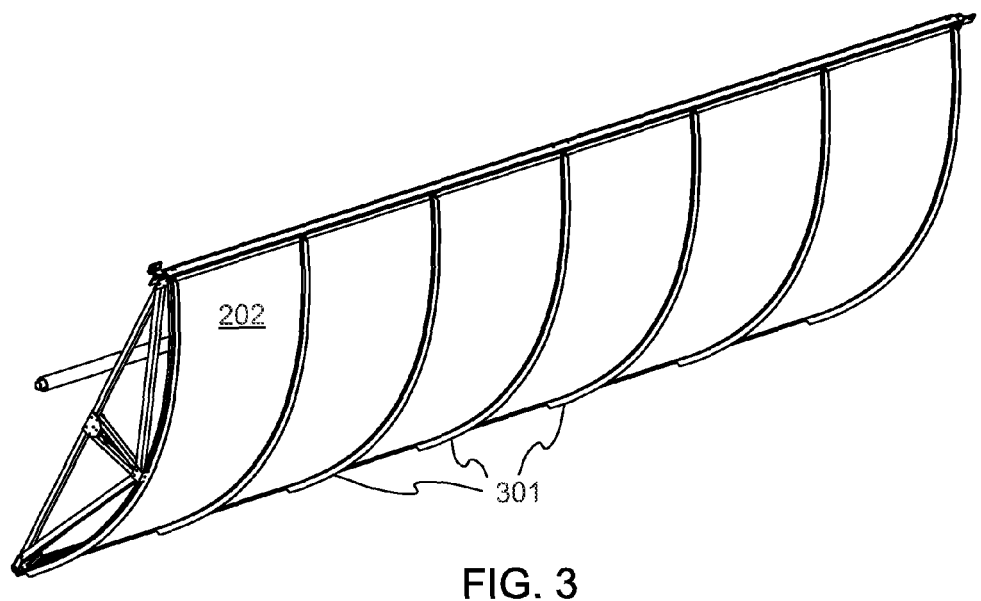
FIG. 3 illustrates the solar collector module of FIG. 2 in an underside oblique view.

FIG. 3 illustrates the collector module 200 in an underside oblique view. The exemplary module 200 includes a set of ribs 301 fixed to the back surface 202 of the reflector 201. The ribs 301 serve to help maintain the shape of the reflector 201.

Figure 4A:
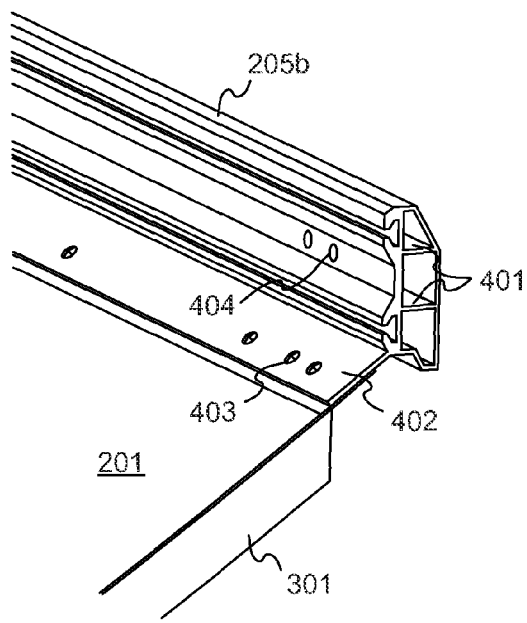
FIGS. 4A and 4B illustrate oblique and end views of a portion of the module of FIG. 2, according to embodiments of the invention.
Figure 4B:
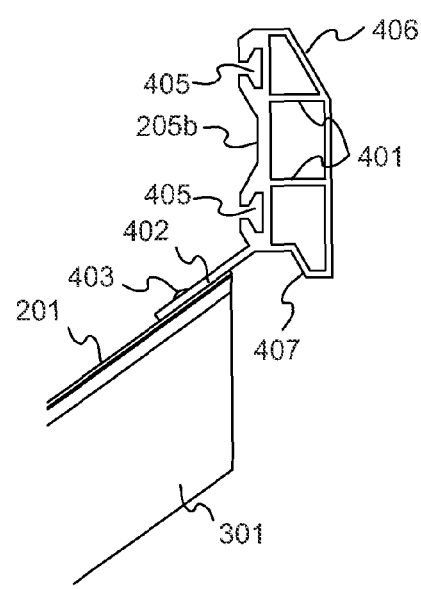

FIGS. 4A and 4B illustrate oblique and end views of a portion of the module 200, showing the configuration of the rail 205b and its attachment to the reflector 201, according to embodiments of the invention. The rail 205b is preferably an extrusion, having a constant cross section along its length. The rail 205b preferably is hollow, and may include internal reinforcement webs 401. Exemplary rail 205b also includes a tab 402 for connecting the rail 205b to the reflector 201, for example by rivets, screws, or other fasteners 403. The tab 402 is preferably tangent to the reflective surface of the reflector 201 when the rail 205b is attached to the reflector 201. The rail 205b may also define one or more holes 404 and dovetail slots 405 on one side of the rail 205b, for attaching the truss connectors as is described in more detail below.

The rail 205a is preferably identical to the rail 205b in cross section, and is attached similarly to the other edge of the reflector 201. As oriented in FIG. 4B, exemplary rail 205a has a height greater than its width. This relationship may be helpful to maximize the area of the reflector 201 while keeping the overall width of the module 200 narrow, for example so that the components of the module 200 can be kept to a specified size for shipping. In other applications where the module components are not so constrained, the rails 205a and 205b may have other aspect ratios.

The rail 205b may include mating features such as a beveled top edge 406 and a complementary angled protrusion 407 at its bottom edge, to facilitate stacking of precursor portions of modules for shipping. (Here, the reflective front surface of the reflector 201 is considered to face the "top" of the reflector, and the back side 202 is considered to face the "bottom" of the reflector. In actual use, the "top" and "bottom" of the rail may not always face directly up and down.) For example, the reflector 201, the rails 205a and 205b, and the ribs 301 of the collector module 200 may form a precursor unit that is preassembled for shipping to an installation site, where the framing members may be added. It is desirable that the components of many modules 200 be compactly packable for shipping, and that shipping damage be avoided.

Figure 5A:
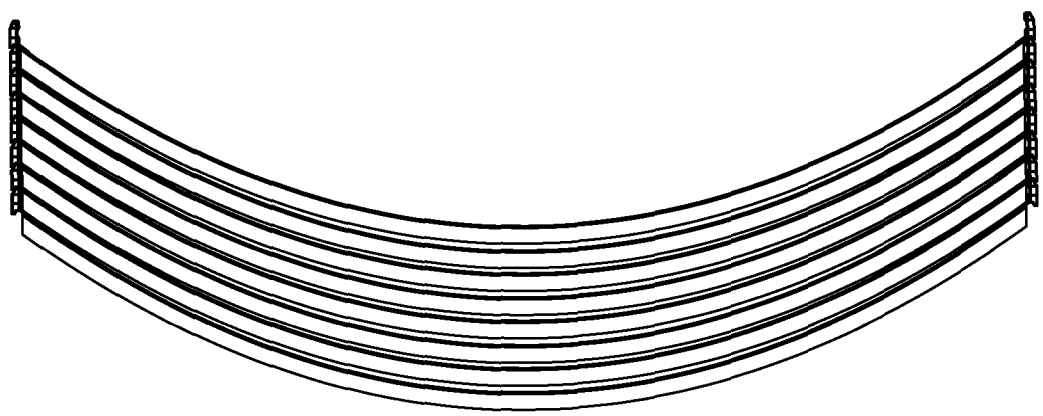
FIGS. 5A and 5B illustrate the stacking of precursor units of a number of solar collector modules, in accordance with embodiments.
Figure 5B:
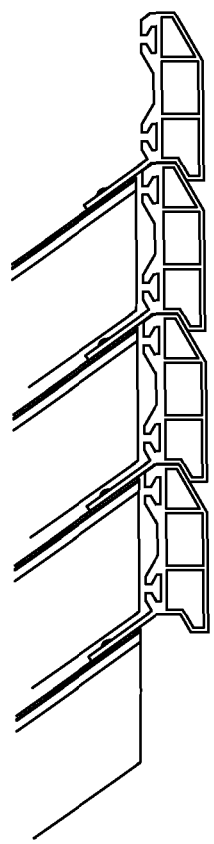

FIGS. 5A and 5B illustrate the stacking of precursor units of a number of modules 200, in accordance with embodiments. The rails nest to space the precursor units apart to avoid damage to the reflectors, and also to inhibit side-to-side motion of the units with respect to each other. While the precursor units are shown in FIGS. 5A and 5B as being stacked with the concave surfaces facing upward, they could also be stacked with the concave surfaces facing downward, or any other suitable direction. A concave-upward stacking arrangement may facilitate on-site assembly of the modules 200, as a particular module 200 may have its structure assembled to it while the precursor portion is still in the stack, and the completed module lifted away for mounting into the collector array. Thus the stack itself may serve as a kind of assembly fixture for each module.

Figure 6A:
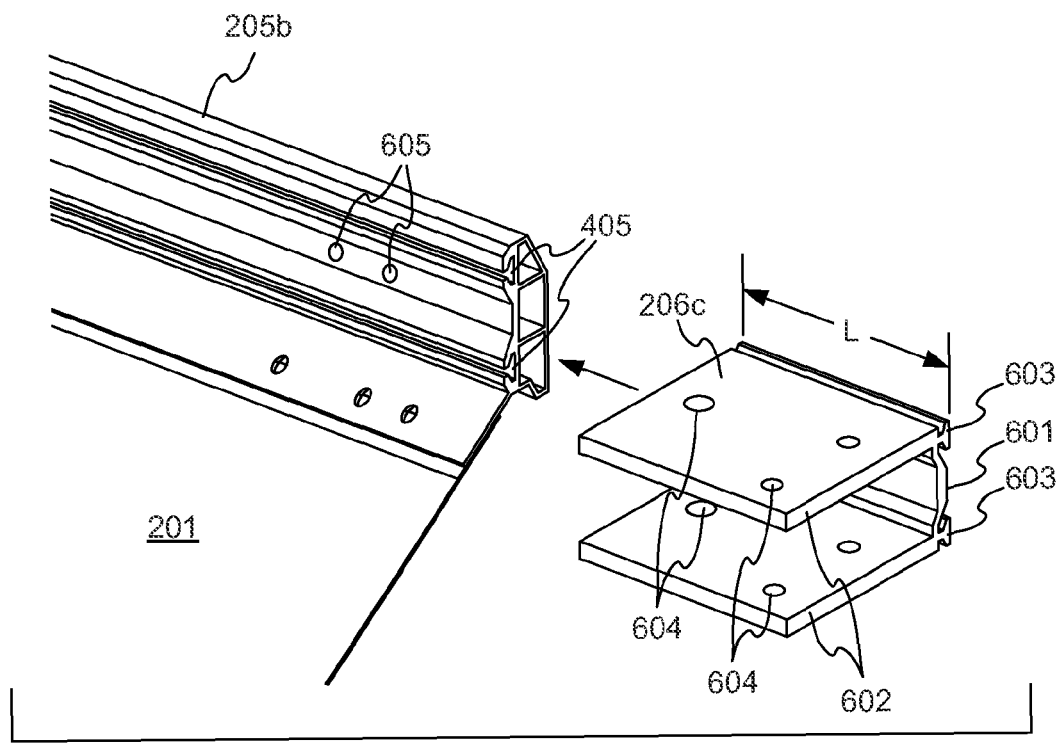
FIGS. 6A and 6B illustrate the assembly of a truss connector to a rail in the solar collector module of FIG. 2, in accordance with embodiments of the invention.
Figure 6B:
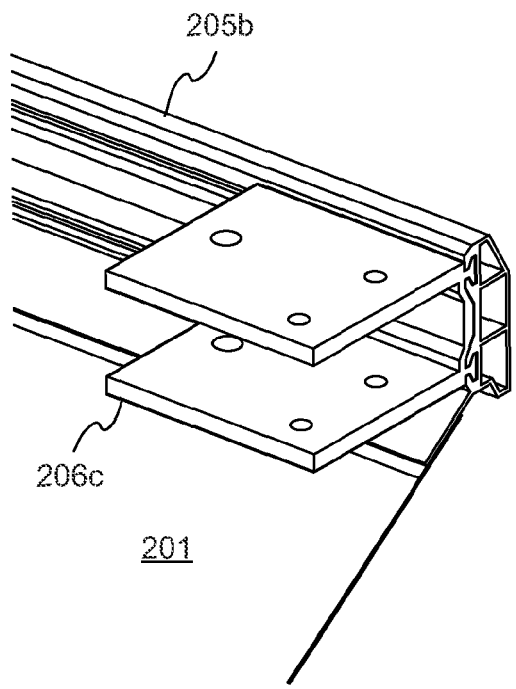

FIGS. 6A and 6B illustrate the assembly of truss connector 206c to rail 205b, in accordance with embodiments of the invention. The exemplary truss connector 206c is preferably formed from a generally U-shaped extrusion having a base portion 601 and two spaced-apart planar sides 602 extending from the base portion 601. The truss connector 206c has a length L. The base portion 601 also includes dovetail protrusions 603, which cooperate with the dovetail slots 405 of the rail 205b, to form ways that enable constrained sliding engagement of the truss connector 206c with the rail 205b. For the purposes of this disclosure, "ways" refers to a set of features that guide two mechanical components in relative motion.

The sides 602 define at least one set of holes 604 for attaching a structural member to the truss connector 206c. FIG. 6A shows the truss connector 206c poised for assembly to the rail 205b, and FIG. 6B shows the truss connector 206c engaged with the rail 205b. Bolts, rivets, or other fasteners may be used via holes 605 and mating holes in the truss connector 206c (not shown). The other truss connectors may engage similarly with their respective rails. Center truss connectors 206b and 206e, if present, are preferably moved into position before the end truss connectors are all in place.

While the exemplary rail 205b includes the dovetail slots 405 that engage with the dovetail protrusions 603 on the truss connector 206c, the ways may be formed using other kinds of features. For example, more or fewer features may be used. The positions of the protrusions and the slots may be reversed, so that the rail includes protrusions and the truss connectors include slots. Other shapes of slots and protrusions may be used, for example T-shaped protrusions may mate with T-shaped slots. Many other arrangements are possible.

Figure 7:
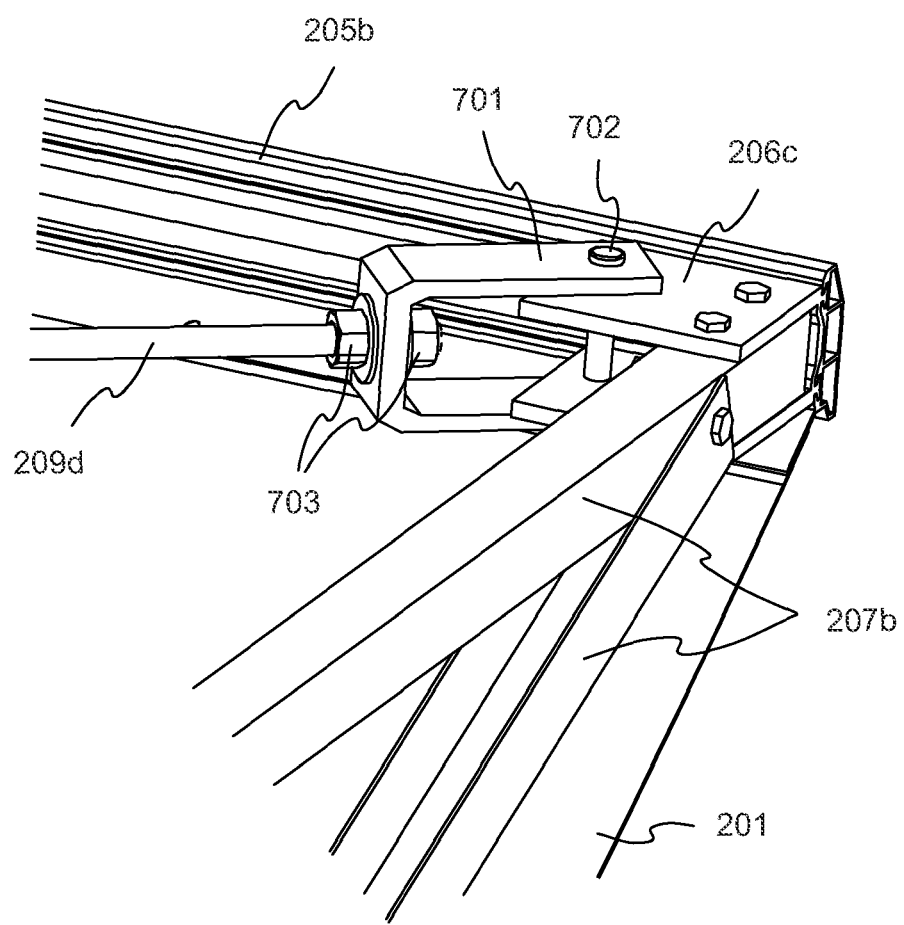
FIG. 7 illustrates the connection of framing members to the truss connector of FIGS. 6A and 6B, in accordance with embodiments of the invention.

FIG. 7 illustrates the connection of some of the framing members to the truss connector 206c, in accordance with embodiments of the invention. In the exemplary embodiment of FIG. 7, the end truss 207b is bolted to the truss connector 206c, while the diagonal brace 209d is connected to a clevis 701, which is in turn attached to the truss connector 206c using a pin 702. The diagonal brace 209d may have a threaded end, and may be attached to the clevis 701 using nuts 703. The nuts 703 may also be used for adjusting the tension in the diagonal brace 209d, to stiffen the structure of the module 200, and to adjust the optical performance of the module 200. The other framing members may be connected similarly to their respective truss connectors. By adding tension to the diagonal braces 209a-d, the shape of the reflector 201 may be adjusted, either during assembly of the module 200, or later during the operation of module 200. Adding tension to the diagonal braces 209a-d, for example by adjusting the nuts 703 to reduce the effective length of the diagonal brace 209d and adjusting similar nuts at other truss connections, will tend to close the reflector 201, and may correct light spillage of light under the receiver tube 201. Reducing tension in the diagonal braces 209a-d tends to open the reflector 201, and may be used to correct light spillage above the receiver tube 210.

Figure 8A:
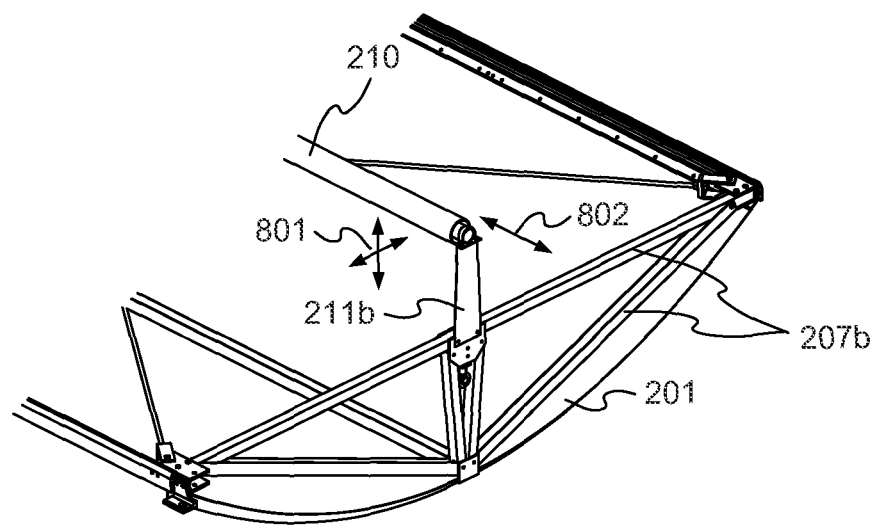
FIGS. 8A and 8B illustrate a system for mounting a receiver tube of the solar collector module of FIG. 2, in accordance with embodiments of the invention.
Figure 8B:
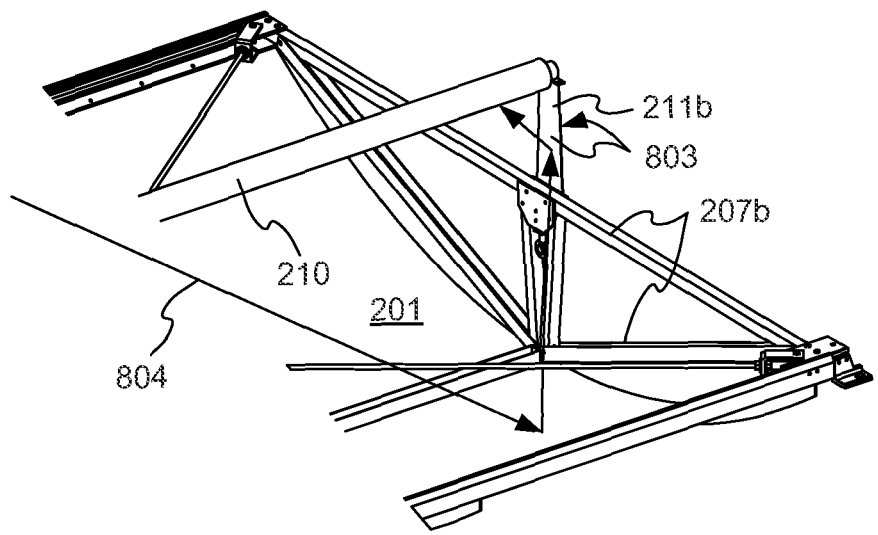

FIGS. 8A and 8B illustrate a system for mounting the receiver tube 210 of the module 200, in accordance with embodiments of the invention. The receiver tube preferably includes a clear outer tube surrounding the conduit through which the working fluid flows. The clear outer tube serves to reduce thermal losses from the working fluid to the environment. In conventional collector modules, the receiver supports may be hinged at their connection to the other module structure, to accommodate thermal expansion and contraction of the module. However, the hinged connection adds complexity and cost to the conventional module.

In accordance with embodiments of the invention and as shown in FIGS. 8A and 8B, the receiver support 211b is fixed to the end truss 207b by bolts, rivets, or another kind of fastener. The receiver support 211b may be made of made of a sheet metal, for example sheet steel or aluminum about 0.040 to about 0.100 inches thick or another suitable thickness selected for adequate strength. The receiver support 211b is shaped to be stiff in directions 801 transverse to the longitudinal axis of the receiver tube 210, so that the receiver tube 210 is fixed at the focal line of the reflector 201 and remains in the proper location as the module 200 rotates. However, in a direction 802, parallel to the longitudinal axis of the receiver tube 210, the receiver support 211b is relatively flexible, and can flex to accommodate thermal expansion of and contraction of the receiver tube 210 and the other structure of the module 200. The receiver support is preferably sized to accommodate all expected thermal expansion and contraction while undergoing only elastic deformation.

In some embodiments, either or both faces 803 of the receiver support 211b may be polished, coated, or otherwise treated to be highly reflective. The reflective surface may serve to reduce end losses from the module 200, wherein incoming solar radiation escapes reaching the receiver tube 210 by exiting the end of the module 200, or by being absorbed by a relatively non-reflective receiver support. As is illustrated by ray 804, the reflective surface 803 may redirect some radiation that might otherwise not reach the receiver tube 210 back to the receiver tube 210. Additional similar receiver supports may be provided at other locations, for example receiver support 211a near the center of the module 200.

According to some embodiments, the cost and assembly efficiency of the module 200 may be enhanced by using like parts in multiple locations within the module 200. This modularization may reduce the number of distinct part types that must be tracked during production and assembly of the module 200, and may reduce opportunities for error in the assembly.

Figure 9:
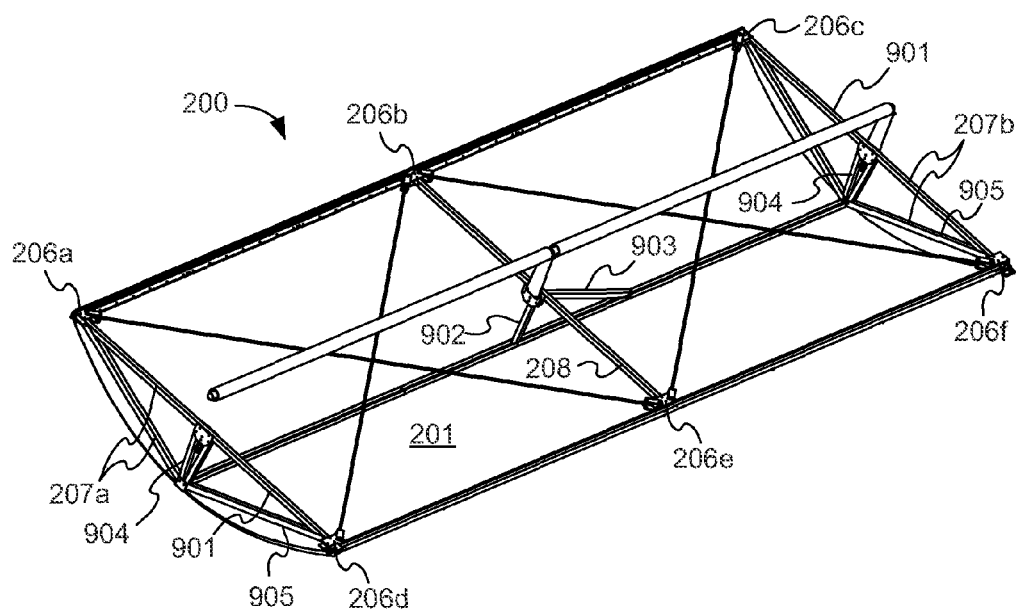
FIG. 9 illustrates several instances of modularization of parts within the solar collector module of FIG. 2, in accordance with embodiments of the invention.

FIG. 9 illustrates several instances of modularization of parts, wherein like parts perform multiple functions within the module 200, in accordance with embodiments of the invention. For example, in exemplary module 200 the center transverse brace 208 is identical to the upper members 901 of the end trusses 207a and 207b. In another example, vertical support 902 and diagonal support 903 for center transverse brace 208 may be identical to near-vertical and diagonal end truss members 904 and 905 of the two end trusses 207a and 207b.

In another example, the center truss connectors 206b and 206d are longer than the corner truss connectors 206a and 206c, because the center truss connectors 206b and 206d receive diagonal braces at both ends, while the corner truss connectors 206a and 206c need only receive a single diagonal brace. However, longer parts identical to the center truss connectors 206b and 206e may be utilized for the other corner truss connectors 206d and 206f, to provide additional material for making a torque transfer connection between adjacent modules.

Figure 10:
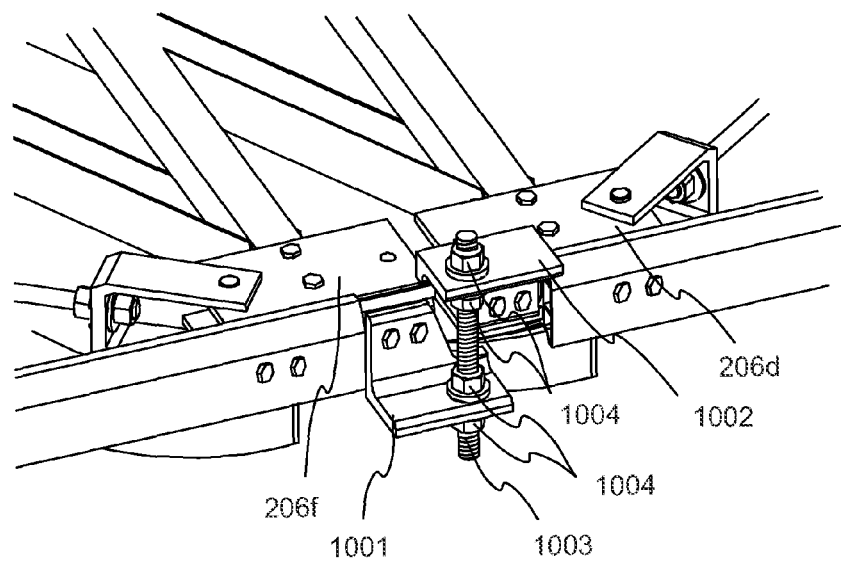
FIG. 10 illustrates a torque transfer connection between two solar collector modules, in accordance with embodiments of the invention.

FIG. 10 illustrates an example of a torque transfer connection between two modules. Corner truss connector 206f of one module and corner truss connector 206d of another module protrude beyond the ends of their respective reflectors. Brackets 1001 and 1002 are attached to the corner truss connectors 206d and 206f. A threaded rod 1003 extends through the brackets 1001 and 1002, which are connected to the threaded rod 1003 using nuts 1004. The relative alignment of the two modules can be adjusted by adjusting the positions of the nuts 1004 on the threaded rod 1003. In addition, the connection provides a degree of compliance in the direction parallel to the rotational axes of the two modules, to accommodate thermal expansion and contraction.

The invention has been described above in terms of presently preferred embodiments so that an understanding of the present invention can be conveyed. There are, however, many configurations for concentrating solar collector modules not specifically described herein but with which the present invention is applicable. In addition, aspects of the invention may be used in applications other than in solar collector modules. The present invention should therefore not be seen as limited to the particular embodiments described herein, but rather, it should be understood that the present invention has wide applicability with respect to collector systems generally. All modifications, variations, or equivalent arrangements and implementations that are within the scope of the attached claims should therefore be considered within the scope of the invention.

What is claimed is:

1. A concentrating solar collector module comprising:
   a reflector having a reflective front surface shaped to concentrate incoming solar radiation onto a focal line, the reflector having two lengthwise edges parallel to the focal line and two ends defining the length of the reflector;
   first and second rails, one rail attached to the reflector at each of the lengthwise edges and extending substantially the length of the reflector;
   a set of truss connectors attached to the rails, the truss connectors and rails comprising ways that enable constrained sliding engagement of the truss connectors along the rails before attachment of the truss connectors to the rails; and
   a plurality of framing members connected to the truss connectors that comprise at least two diagonal framing members, each diagonal framing member connected to a truss connector on the first rail and a truss connector on the second rail, the diagonal framing members crossing the solar collector module in front of the reflective surface and where the effective length of each diagonal framing member is adjustable.

2. The concentrating solar collector module of claim 1, wherein the framing members form a structural lattice that cooperates with the reflector to lend rigidity to the solar collector module, and at least some of the framing members are disposed in front of the front reflective surface.

3. The concentrating solar collector module of claim 1, wherein the ways comprise dovetail protrusions on the either the rails or the truss connectors, and complementary dovetail slots on the other of the rails or the truss connectors.

4. The concentrating solar collector module of claim 1, wherein the ways comprise T-shaped protrusions on the either the rails or the truss connectors, and complementary T-shaped slots on the other of the rails or the truss connectors.

5. The concentrating solar collector module of claim 1, wherein the set of truss connectors comprises an end truss connector at each end of each rail, and wherein the framing members comprise two end trusses, one end truss at each end of the solar collector module connected between the respective end truss connectors.

6. The concentrating solar collector module of claim 1, wherein the frame members comprise at least four diagonal framing members.

7. The concentrating solar collector module of claim 5, wherein the frame members comprise at least one transverse brace connected to a truss connector on the first rail and a truss connector on the second rail, the transverse brace crossing the solar collector module in front of the reflective surface.

8. The concentrating solar collector module of claim 7, wherein the transverse brace is identical to a member of each end truss.

9. The concentrating solar collector module of claim 7, further comprising a vertical support and a diagonal support for the transverse brace, and wherein the vertical support and the diagonal support are identical to members of the end trusses.

10. The concentrating solar collector module of claim 5, further comprising a fixed receiver support extending from one of the two end trusses.

11. The concentrating solar collector module of claim 10, wherein the receiver support flexes to accommodate thermal expansion and contraction in a solar collector comprising the module.

12. The concentrating solar collector module of claim 10, wherein the receiver support comprises a reflective surface, to reduce end losses from the solar collector module.

13. The concentrating solar collector module of claim 1, wherein at least one truss connector at a corner of the module is identical to another truss connector positioned other than at a corner of the module.

14. The concentrating solar collector module of claim 1, wherein each rail is hollow, and comprises at least one internal reinforcement web.

15. The concentrating solar collector module of claim 1, wherein each rail comprises top and bottom edge features that include a protrusion on either the top or bottom edge of the rail and a complementary indentation on the other of the top or bottom edge of the rail, the protrusion and indentation aligned to mate when a precursor portion of the solar collector module is stacked with a precursor portion of another like solar collector module.

16. The concentrating solar collector module of claim 1, wherein each rail comprises a tab tangent to the front reflective surface, the tab attached to the reflector.

17. The concentrating solar collector module of claim 1, further comprising a set of parabolic ribs in contact with a back side of the reflector, opposite the reflective front surface.

18. The concentrating solar collector module of claim 1, further comprising bearings that define a rotational axis of the solar collector module, the rotational axis parallel to the focal line.

19. A method of assembling a concentrating solar collector module, the method comprising:
   providing a reflector having a reflective front surface shaped to concentrate incoming solar radiation onto a focal line, the reflector having two lengthwise edges parallel to the focal line and two ends defining the length of the reflector, and first and second rails, one rail attached to the reflector at each of the lengthwise edges and extending substantially the length of the reflector;
   providing a set of truss connectors, the truss connectors and rails comprising ways that enable constrained sliding engagement of the truss connectors along the rails; and
   engaging the truss connectors with the rails, moving the truss connectors into position by sliding them along the rails;
   connecting a plurality of framing members to the truss connectors; and
   tensioning the diagonal framing members to stiffen the solar collector module.

20. The method of claim 19, further comprising adjusting optical performance of the solar collector module by adjusting the tension in at least one of the diagonal framing members.

21. A concentrating solar collector comprising:
at least two collector modules, each module comprising a reflector having a reflective front surface shaped to concentrate incoming solar radiation onto a focal line, and the reflector having two lengthwise edges parallel to the focal line and two ends defining the length of the reflector; first and second rails, one rail attached to the reflector at each of the lengthwise edges and extending substantially the length of the reflector; a set of truss connectors attached to the rails, the truss connectors and rails comprising ways that enable constrained sliding engagement of the truss connectors along the rails before attachment of the truss connectors to the rails; a plurality of framing members connected to the truss connectors, forming a structural lattice that cooperates with the reflector to lend rigidity to the solar collector module, at least some of the framing members being disposed in front of the front reflective surface; and bearings that define a rotational axis of the module parallel to the focal line;
wherein at least one of the truss connectors extends beyond an end of its respective module, and the concentrating solar collector further comprises a connection between the extending truss connector and an adjacent collector module, to transmit torque between the two adjacent modules.

* * * * *